United States Patent

[11] 3,567,039

| [72] | Inventor | George Q. Evans |
| | | 204 S. Locust St., Compton, Calif. 90221 |
| [21] | Appl. No. | 761,383 |
| [22] | Filed | Aug. 5, 1968 |
| | | Division of Ser. No. 614,430, Feb. 7, 1967, Pat No. 3,455,469. |
| [45] | Patented | Mar. 2, 1971 |

[54] ELEVATOR CONVEYOR AND STORAGE RACK SYSTEM
5 Claims, 10 Drawing Figs.

[52] U.S. Cl........................................................ 211/162,
 27/1, 211/126
[51] Int. Cl...................................................... A47f 5/00,
 A61g 17/00
[50] Field of Search............................................ 211/162,
 126, 88, 94, 94.5, 71, 28; 312/350, 321, 317—18, 334—47, 330—32, 349, 307; 27/27, 35, 26, 1, 2; 52/136

[56] References Cited
UNITED STATES PATENTS

| 1,114,455 | 10/1914 | Fisher........................... | 211/126X |
| 1,242,410 | 10/1917 | Albrecht........................ | 27/26 |
| 1,285,394 | 11/1918 | Robinson....................... | 211/126X |
| 1,622,529 | 3/1927 | McMiller....................... | 27/35 |
| 2,817,138 | 12/1957 | Merz............................. | 27/26 |
| 2,946,458 | 7/1960 | Du Boff et al................. | 211/88 |
| 3,254,773 | 6/1966 | Diem............................. | 27/1X |
| 3,399,784 | 9/1968 | Buchbinder et al........... | 211/162X |

Primary Examiner—Ramon S. Britts
Attorney—Huebner & Worrel

ABSTRACT: A system for storing articles in a rack having a plurality of shelves and removing them therefrom using a movable and adjustably elevated loading conveyor. The storage areas in the rack are provided with slide assemblies adapted to receive an article to be stored therein and the loading conveyor is movable to positions relative to said rack which directly align articles carried therein with storage areas in the rack so that the articles can be readily loaded and unloaded.

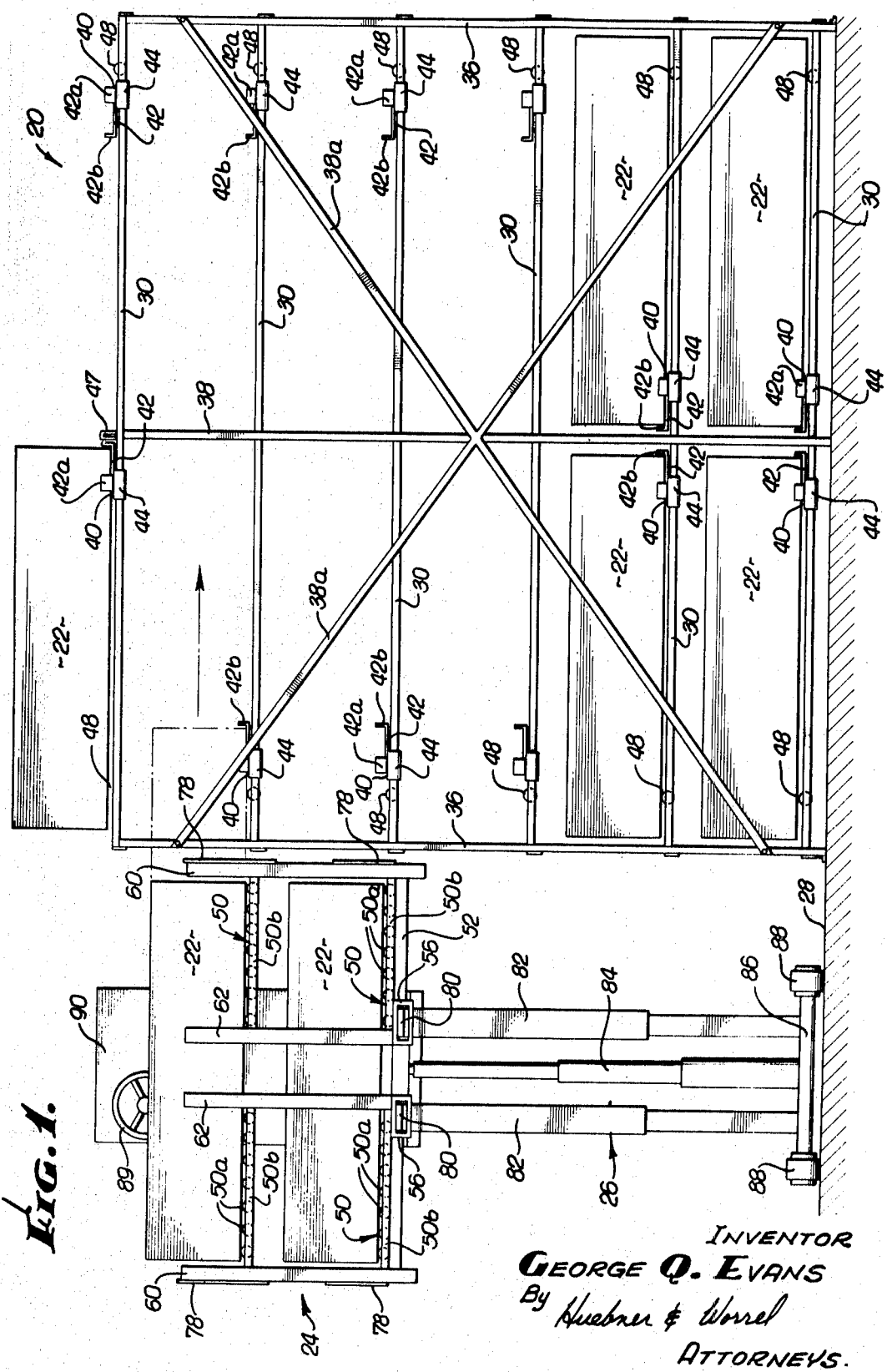

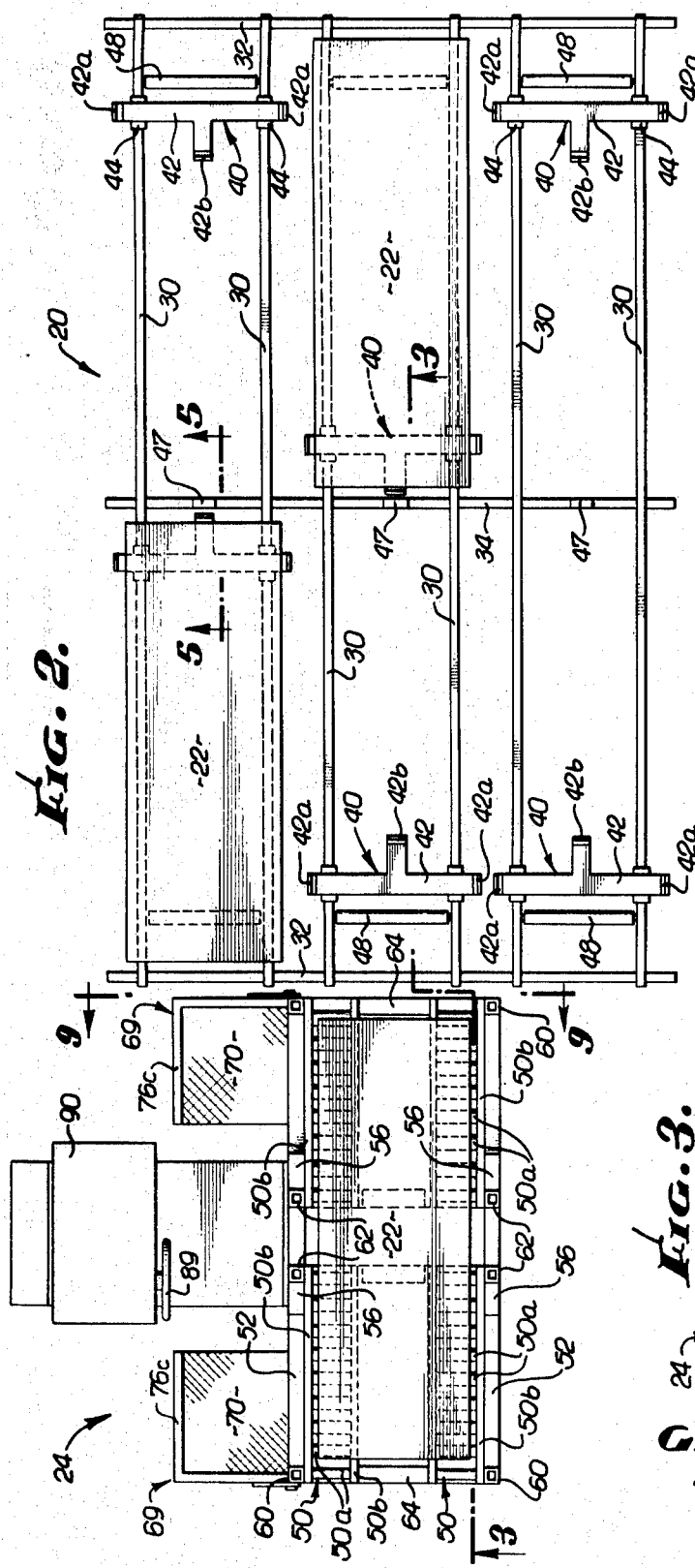
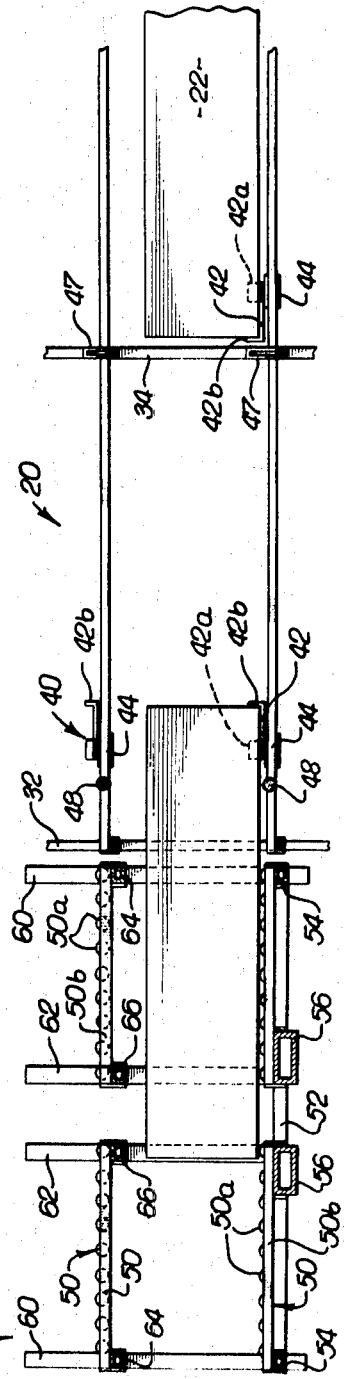

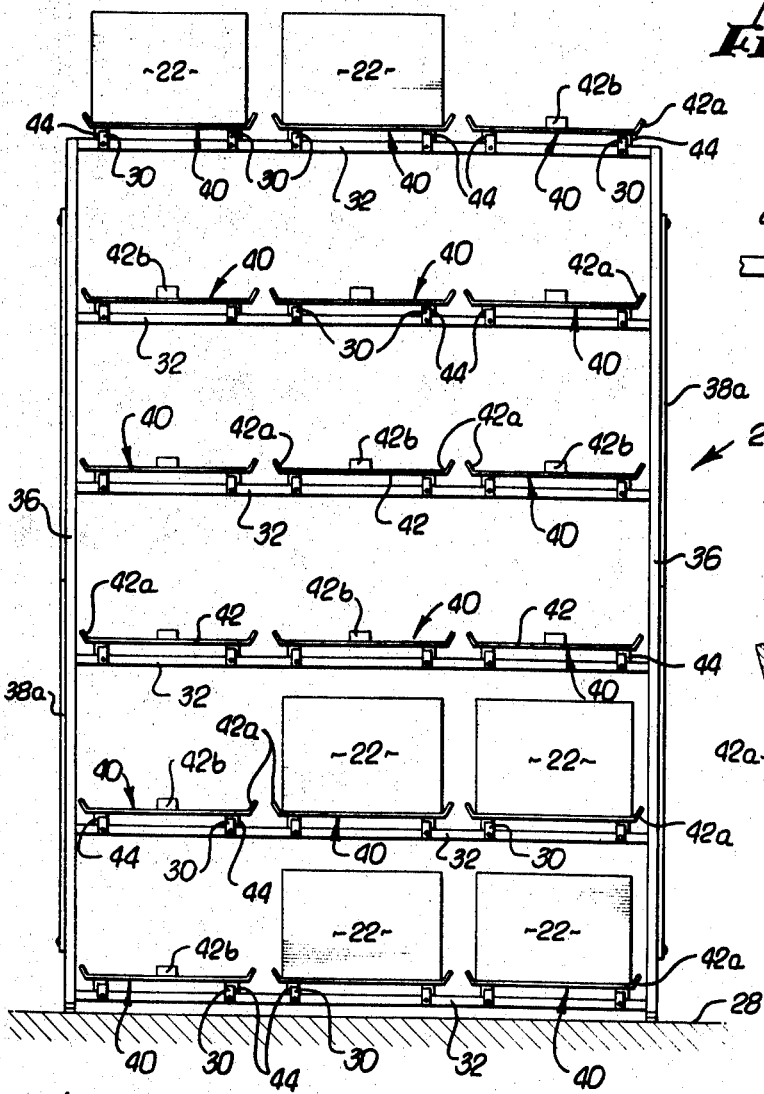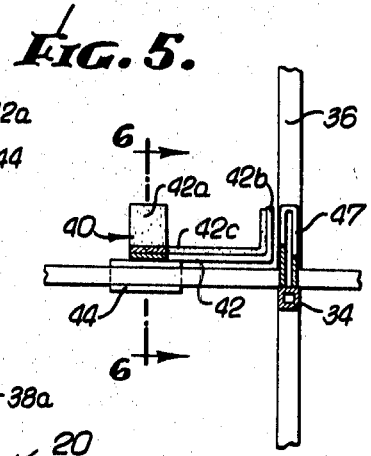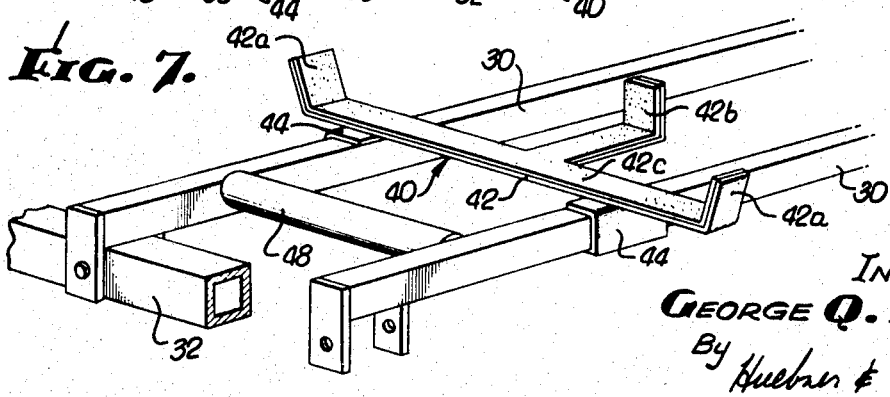

INVENTOR.
GEORGE Q. EVANS
By Huebner & Worrel
ATTORNEYS.

3,567,039

ELEVATOR CONVEYOR AND STORAGE RACK SYSTEM

This is a divisional application of my application Ser. No. 614,430 filed Feb. 7, 1967, now U.S. Pat. No. 3,455,469 issued Jul. 15, 1969.

BACKGROUND OF THE INVENTION

Reference hereinafter will be primarily to the storing of burial caskets since this invention is particularly appropriate for use therewith though it can be adapted to facilitate storage of many other articles. In the casket industry the expense of space required for storing and handling caskets often adds to the cost of the caskets since ordinary methods for storage articles are not appropriate. That is, the exterior surfaces of caskets are often covered with very expensive finishes and artistic decorations which are likely to become scratched and otherwise damaged unless handled with special care. Thus, the caskets can ordinarily be stacked for storage only through laborious, time-consuming effort, or, if left unstacked to avoid the risk of damage a great deal of vertical storage space is wasted.

SUMMARY OF THE INVENTION

Therefore, it is a primary object of this invention to provide a storage rack and elevator conveyor system which is capable of efficiently stacking articles for storage with a minimum of time spent during the storing operation and a minimum risk of damage to the articles stored.

It is a further object of this invention to provide a storage rack for stacking articles which includes a number of horizontal shelves, each having storage areas thereon which have slide assemblies adapted to facilitate loading and unloading articles thereon.

Another object of this invention is to provide an elevator conveyor for loading and unloading articles onto a storage rack having a number of shelves with storage areas thereon which is readily movable into positions adjacent to the storage areas of the rack so as to facilitate said loading and unloading of articles carried by the elevator conveyor.

Other objects and advantages will become apparent from the following description and drawings wherein:

BRIEF DESCRIPTION OF THE DRAWINGS

FIG. 1 is a side elevational view of the casket rack and an elevated conveyor pallet in accordance with this invention showing caskets in position for unloading from the conveyor pallet into rack;

FIG. 2 is a top plan view of the rack and elevated conveyor pallet shown in FIG. 1;

FIG. 3 is a vertical, longitudinally sectioned view of the rack and conveyor pallet taken through line 3—3 in FIG. 2 with a casket being positioned in the rack;

FIG. 4 is an end elevational view of a rack as shown in FIGS. 1 and 2;

FIG. 5 is a fragmented, vertical enlarged, sectional view taken through 5—5 in FIG. 2 showing a portion of a casket slide mounted on the rack;

FIG. 6 is a detailed, enlarged, sectional view of another portion of the slide taken through 6—6 in FIG. 5;

FIG. 7 is a fragmented perspective view of a casket slide and adjacent portions of the rack upon which it is mounted;

DESCRIPTION OF THE PREFERRED EMBODIMENT

Figure 8:
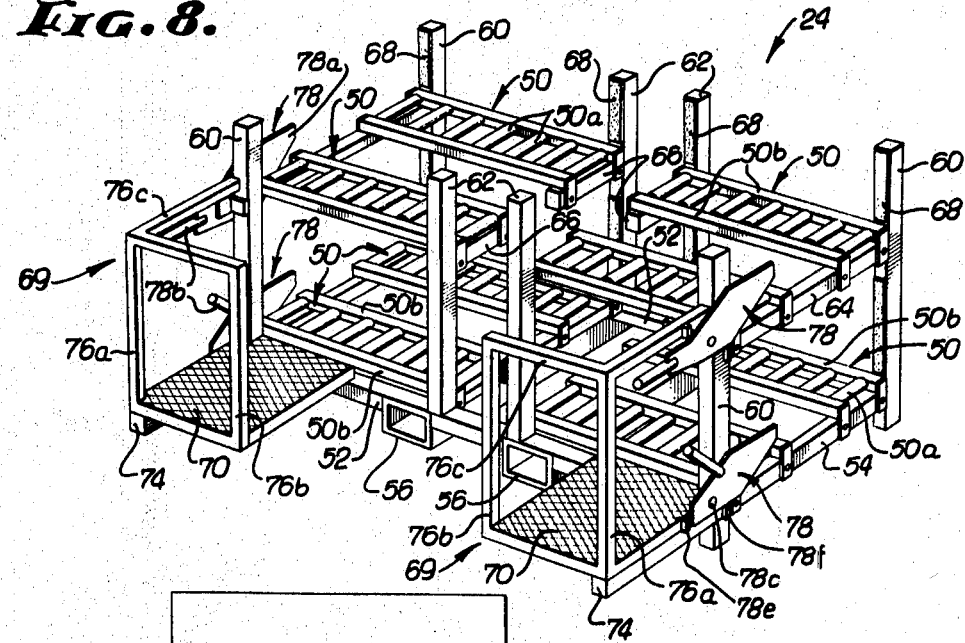
FIG. 8 is a perspective view of the casket conveyor pallet as used with the rack in FIGS. 1, 2, and 3.

An elevator conveyor and storage rack system in accordance with this invention adapted for the storage of burial caskets is shown in the drawings. Here, the storage rack generally designated 20 is preferably constructed of square cross section stringers to hold 36 roughly rectangular caskets 22 stacked for ready removal six high on six shelves in three parallel rows of two caskets 22 each. That is, on each of the six shelves of the rack 20 six caskets 22 are stored.

The elevator conveyor includes a casket platform or conveyor pallet generally designated 24 constructed to removably carry normally two stacked caskets 22. It is adapted to be utilized with a forklift truck 26 which can raise or lower the pallet 24 to predetermined positions relative to the storage rack 20 to load or unload caskets 22 therein. In order to facilitate movement of the caskets 22 they are mounted on conveyors when carried by the pallet 24 and a sliding support when stored in the rack 20.

The storage rack 20 has a number of horizontal storage shelves and is a generally rectangular frame structure which is normally secured in a fixed position on a warehouse floor 28. Each of the storage shelves of the rack 20 include six equal length parallel and horizontal longitudinal stringers 30 disposed in the same plane in three sets of adjacent pairs of stringers 30. The pairs of stringers in a set are spaced from each other slightly less than the width of a casket 22 and from the next stringer 30 of a set, a sufficient distance to prevent caskets 22 mounted on one paired set of stringers 30 from touching caskets 22 mounted on an adjacent paired set of stringers 30. The length of each of the longitudinal stringers 30 is about twice as long as a casket 22.

The stringers 30 in each shelf are secured to end stringers 32 and a horizontal middle stringer 34 centrally secured across stringers 30. Each of the end stringers 32 and middle stringers 34 are normal to and disposed in the same horizontal plane as the longitudinal stringers 30 to which they are secured.

Each of the storage shelves of the rack 20 formed by stringer 30, 32 and 34 in the same horizontal plane are spaced sufficiently from each other in height to allow caskets 22 to be carried therein without abutting the frame of the next higher shelf. Support is provided by means of four vertical end stringers 36 which are secured to each corner of rack 20. These vertical end stringers 36 rest on floor 28 and extend up sufficiently to support the opposite ends of each of the spaced horizontal end stringers 32 between them. A pair of vertical middle stringers 38 extending from floor 28 up along each side of rack 20 provide support for the attached opposite ends of each of the spaced horizontal end stringers 32 between them. A pair of vertical middle stringers 38 extending from floor 28 up along each side of rack 20 provide support for the attached opposite ends of the horizontal middle stringers 34 and the center portions of the two outer horizontal longitudinal stringers 30. As supplemental support for the rack 20 a pair of side stringers 38a on each side diagonally extend from their end attachment between the upper and lower portions of the opposite vertical end stringers 36 and cross to form an X-shaped side frame at the outside center portion of vertical middle stringers 38.

Thus, a space large enough to store a casket 22 longitudinally is provided by rack 20 on both sides of the horizontal middle stringers 34 on top of each set of the paired horizontal longitudinal stringers 30. Each paired set of these horizontal longitudinal stringers 30 serve as rails which carry on opposite sides of the horizontal middle stringers 34 a longitudinally movable slide assembly or slidable support means generally designated 40 which is adapted to receive and support the end of a casket 22.

As best viewed in FIGS. 6 and 7 the slide assemblies 40 are comprised of a generally flat T-shaped horizontal base plate 42 in which the arms of the T extend laterally the width of a casket 22 and are inclined upwardly at each end to form short sidewalls or tabs 42a to cradle a casket 22 held therein and the leg of the T is pointed toward the horizontal middle stringer 34 and terminates in a short upright or vertical end wall or tab 42b. In order to avoid scratching the finish of caskets and to provide a soft friction engagement thereto the upper and inner surfaces of base 42 are covered with carpeting or other protective material 42c.

To provide a slidable mounting on each set of paired horizontal longitudinal stringers or rails 30 for the slide assemblies or slidable support means 40 a pair of inwardly and oppositely opening slidable elements or relatively short semi-U-shaped channel brackets 44 are secured to the bottom of base plate 42. They are spaced the same distance apart as a set of paired stringers 30, on which they are slidably mounted, and longitudinally aligned parallel therewith. The channel brackets 44 have inner dimensions slightly larger than the outer periphery of stringers 30 and are preferably lined with a friction reducing material 46, such as Teflon, to provide a long wearing, minimum friction slidable engagement therewith.

The alignment of each of the slide assemblies 40 is substantially symmetrical relative to the set of paired stringers or rails 30 to which each is slidably mounted. The upright end wall 42b of each slide assembly 40 is centered therein so that when slid toward the horizontal middle stringer 34 it abuts against a short upright slide stop 47 which is a small rectangular plate secured to the horizontal middle stringers 34 centrally between each set of the paired longitudinal stringers 30. Thus, the distance the slide assemblies 40 can slide into rack 20 is limited thereby. In order to further facilitate loading and unloading caskets 22 in the rack 20 horizontal rollers 48 are rotatably mounted laterally between each set of paired horizontal longitudinal stringers 30 adjacent the front of the rack 20. A casket 22, when received in rack 20, therefore, is rolled onto a roller 48 and then its forward end is lodged in slide assembly 40 which is slid back until halted by slide stop 47, and the intermediate portions of the bottom of casket 22 are carried by roller 48. Thus, there is provided movable support for each end of the caskets 22.

Figure 9:
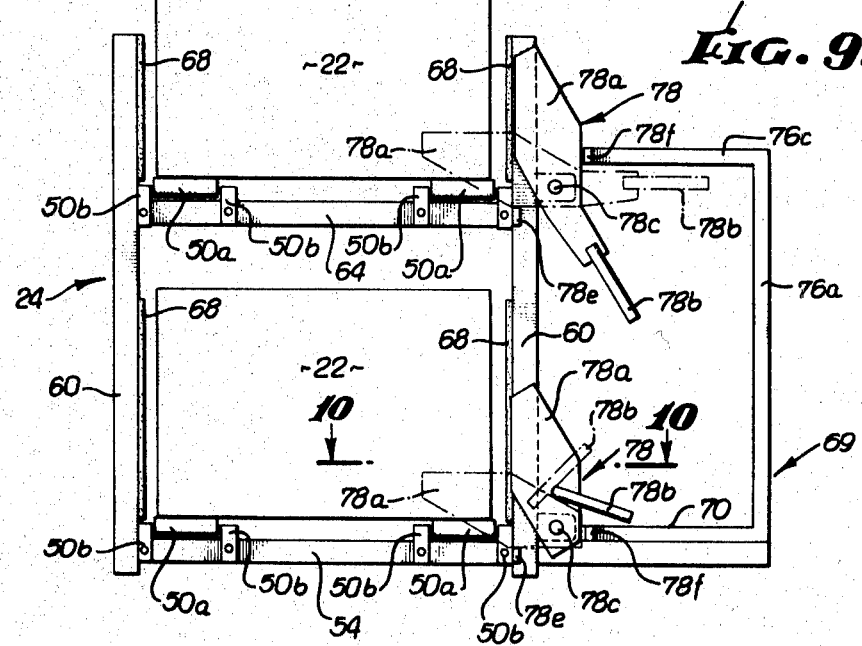
FIG. 9 is an enlarged end elevational view of the conveyor pallet taken through line 9—9 in FIG. 2.
Figure 10:
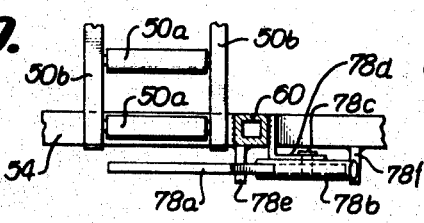
FIG. 10 is a detailed sectional view of a casket stop and the portion of the conveyor pallet adjacent thereto.

The pallet 24 of the elevator conveyor in accordance with this invention is best viewed in FIGS. 8 and 9. It is comprised essentially of a double deck frame structure in which each deck is just large enough to carry a casket 22 which is mounted for longitudinal movement on parallel conveyors 50. Each of the conveyors 50 is comprised of a plurality of spaced, relatively short parallel rollers 50a rotatably mounted laterally between a pair of spaced, parallel conveyor side bars 50b so as to provide a planar top surface which is above the side bars 50b.

The lower deck of pallet 24 is framed with a pair of parallel horizontal longitudinal base beams 52 spaced from each other slightly wider than the width of a casket 22 and extending slightly longer than the length of a casket 22. Interconnecting each end of these beams 52 together and normal thereto are a pair of lower horizontal end beams 54 which each extend out a short distance on one side beyond one of the longitudinal base beams 52. Centrally and normally extending laterally and horizontally between and under longitudinal base beams 52 are a pair of hollow beam, parallel fork receiving channels 56 spaced apart the same distance as the fork prongs of a forklift truck. These channels 56 are adapted to receive such fork prongs therein securely enough to permit lifting of the pallet 24.

Secured on top of and longitudinally extending between the lower horizontal end beams 54 and the adjacent fork receiving channel 56 and inwardly abutting the opposite longitudinal base beams 52 are the four conveyors 50 arranged in two laterally spaced and longitudinally aligned pairs longitudinally spaced from each other about equal to the distance between the two fork receiving channels 56. The upper surfaces of the rollers 50a thereof are in the same horizontal plane and form the lower deck support for a casket 22 to be carried thereon.

The upper deck of the pallet 24 is comprised of the four conveyors 50 spaced above the lower deck a slightly greater distance than the depth of a casket 22 and in substantially identical arrangement as the conveyors 50 in the lower deck. In order to support these conveyors 50 four vertical corner posts 60 are secured at the juncture of each of the horizontal end beams 54 with the longitudinal base beams 52 and four vertical intermediate posts 62 arise from the juncture of these longitudinal base beams 52 with the forklift channels 56. Extending normally between the corner posts 60 on each end are upper horizontal end beams 64 longer than the width of a casket 22 and spaced immediately above the lower horizontal end beams 54 a greater distance than the depth of a casket 22. Extending inwardly in the same horizontal plane from each of the intermediate posts 62 are four short support bars 66 slightly longer than the width of a conveyor 50. The four conveyors 50 which form the upper deck are, in turn, supported longitudinally on top of and between the support bars 66 and the portion of the nearest upper horizontal beam 64 adjacent to a corner post 60. As in the lower deck the upper surface of the roller 50a of the conveyors 50 in the upper deck are all in a common horizontal plane to support a casket 22 thereon. The upper ends of the posts 60 and 62 extend a short distance above the plane of the upper deck to prevent side slippage of a casket 22 carried thereon and each of these posts is preferably covered with a carpeting or other protective material 68 on the inner portion thereof which will bear against a casket 22 supported on the platforms and prevent its surface from becoming scratched.

Extending laterally from one side of the pallet 24 but spaced outwardly enough to permit entry of the prongs of a forklift truck 26 into the fork receiving channels 56 are a pair of auxiliary platforms 69 which provide spaces for a workman to stand when loading or unloading caskets into or from the pallet 24 or for controlling the forklift truck 26. These auxiliary platforms 69 are comprised of a plate floor 70 extending horizontally in substantially the plane of the lower deck and supported by a laterally extending portion 74 of each of the lower horizontal end beams 54 and the adjacent portion of the longitudinal base beam 52. To strengthen the floor 70 and protect a workman standing on it, each auxiliary platform 69 has arising from its outer corner and its inner corner, respectively, a vertical corner guardrail 76a and a vertical inner guardrail 76b which are interconnected at their top ends by a horizontal upper guardrail 76c which also extends inwardly to join the adjacent corner post 60.

In order to maintain caskets 22 in position on the pallet 24 pivotally mounted stop assemblies 78, best viewed in FIGS. 8 and 9, are positioned laterally relative to each deck to block movement of a casket 22 carried by pallet 24 at each end of both decks. That is, in the embodiment shown there are four stop assemblies 78, one on each end of each deck. These stop assemblies 78 are each comprised of a generally flat, irregular-shaped, elongated plate 78a to which a short handle 78b is attached at one end. A short, centrally located axle 78c extends normally from the central portion of plate 78a and pivotally connects each of the stop assemblies 78 to an L-shaped plate 78d attached to the posts 60 which are adjacent to a loading platform near the juncture of lower and upper horizontal end beams 54 and 64. The assemblies 78 can be moved so that they swing laterally to a closed position blocking a portion of each end of the upper and lower pallet decks as shown in the dotted lines in FIG. 9 or swing to an open position as shown in the continuous line drawings thereof in FIG. 9. In order to limit the travel of the stop assemblies 78 in the open position a short, longitudinally protruding stud 78e is secured to the adjacent portion of beams 54 and 64 below and inwardly of the pivotal mounting the stop assemblies 78 so as to bear against the lower edge of plates 78a thereof. In a like manner a longitudinally protruding stud 78f is secured to the edge portion of each upper quardrail 76c and floor 70 which is above and outwardly from the pivotal mounting of stop assemblies 78 so as to bear against the upper edge of plate 78a thereof and limit its travel in the open position.

A suitable elevating means for the pallet 24 is the conventional forklift truck 26 as shown in FIG. 1. Such a truck includes a pair of laterally spaced horizontal fork prongs 80 adapted to slide into the fork receiving channels 56 of pallet 24. The fork prongs 80 are elevated and lowered by a pair of spaced vertically telescoping legs 82 and an interconnected central vertically extending hydraulic power lift 84, each of which are mounted on a base platform 86 of the lift truck 26. This base platform 86 is mounted on a set of wheels 88 which are moved and turned by conventional means such as through the steering wheel 89 shown mounted in the driving compartment 90 of the forklift truck 26 which is, in turn, lifted with the fork prongs 80.

In operation, a pair of caskets 22 which are to be loaded in a rack 20 are rolled longitudinally through an end of pallet 24 onto the upper and lower decks formed by the conveyors 50. At this time the stop assemblies 78 are pivoted to open position on the end through which the caskets 22 are loaded. When the caskets 22 are fully mounted on the platforms of the pallet 24 the stop assemblies 78 are pivoted to closed position. Then a lift truck 26 is driven to the pallet 24 and its fork prongs 80 are guided into the fork receiving channels 56 of the pallet 24. The lift truck 26 carries the pallet 24 and caskets 22 loaded thereon to a rack 20 and is turned so that the longitudinal axis of pallet 24 is aligned with the longitudinal axis of rack 22 and is also positioned directly in alignment with one of the three rows of storage spaces on either end of the rack 20.

Then the pallet 24 is elevated by the lift truck 26 until one of the decks thereof is substantially in horizontal alignment with a shelf of rack 20 having a vacant space in which a casket 22 is desired to be stored. At this time a workman opens the stop assembly 78 on the adjacent end of pallet 24 and rolls a casket 22 therefrom over a roller 48 in the rack 20 and lodges its forward end in a slide assembly 40 which has been slid outwardly to receive the casket 22. The job is completed by pushing casket 22 into the rack 20 which causes the engaged slide assembly 40 to slide inwardly until it rests against a slide stop 47.

In a like manner as many caskets 22 as there are available vacant spaces in rack 20 may be loaded therein. To unload a casket 22 from rack 20 the loading procedure is reversed. That is, the forklift truck 26 carries a pallet 24 adjacent to an end of rack 20 so that one of the decks of pallet 24 is in longitudinal alignment with the space on a shelf of rack 20 from which a casket 22 is desired to be removed. The stop assembly 78 on the deck to be loaded is opened and the casket 22 pulled from the rack 20 over roller 48 onto the deck of the pallet 24 which slides the slide assembly 40 outwardly into position to receive another casket for storage. When the caskets 22 are loaded on the pallet 24 the stop assemblies 78 on each end are closed.

During loading and unloading of caskets 22 from pallet 24 the workmen normally will stand on the floor 70 of the auxiliary platforms 69 so as to be in a good position to grip the caskets 22. Also, the open space between the conveyors 50 which form the lower deck can be filled with horizontal load supporting screens (not shown) which may be used as additional floor spaces on which workmen may stand while loading or unloading caskets 22.

Although I have herein shown and described my invention in what iI have conceived to be the most practical and preferred embodiment, it is recognized that departures may be made therefrom within the scope of my invention.

I claim:

1. A storage rack for horizontally elongated articles possessing sufficient longitudinal rigidity to be sustained upon widely separated individual transverse support means comprising: parallel horizontal frame means defining the bottom of a shelf area, said area being open at one end for reception of articles, a rollable means transversely bridging said frame means only in a region adjacent the open end with the upper peripheral surface of the rollable means disposed above the plane of the frame means, a slidable support means mounted upon said frame means having an article supporting surface in a horizontal plane generally coincident with the upper surface of said rollable means and having slide elements engaging said frame means, said slidable support means being shiftable on said frame means from a location adjacent said rollable means to a position remote from the rollable means, the rollable means being adapted to movably support an article introduced through the open end and to present a portion of the article to the slidable support means, the weight of the article when a portion of the article is resting upon the slidable support means causing frictional engagement between said article and said shiftable support means sufficient upon advancement of said article by external force to propel said shiftable support means along said frame means to a desired location whereby the article becomes supported at one end region by the rollable means and at the other end region by the slidable support means, and stop means remote from said open end limiting the shifting movement of said slidable support means.

2. A storage rack as defined in claim 1 wherein said rollable means is a roller bridging said frame means.

3. A storage rack as defined in claim 1 wherein said slidable support means includes a cradle having a base plate extending transversely between said parallel horizontal frame means and a leg extension extending normal to the axis of said base plate.

4. A storage rack as defined in claim 1 wherein said parallel horizontal frame means includes parallel spaced apart beams.

5. A storage rack as defined in claim 1 wherein a plurality of parallel, horizontal frame means are superimposed in vertically spaced relation, one above the other, each defining the bottom of a shelf area, and all such frame means above the lowermost defining the upper limit of a shelf area therebelow.